US005253224A

United States Patent [19]

Van Doesburg

[11] Patent Number: 5,253,224

[45] Date of Patent: Oct. 12, 1993

[54] METHOD AND ELECTRICAL SYSTEM FOR RECORDING AND PROCESSING TIME-RELATED DATE

[75] Inventor: Evert J. Van Doesburg, Sleewijk, Netherlands

[73] Assignee: Industrial Control Systems B.V., Hardinxeld-Giessendam, Netherlands

[21] Appl. No.: 635,124

[22] PCT Filed: Sep. 4, 1989

[86] PCT No.: PCT/NL89/00065

§ 371 Date: Mar. 5, 1991

§ 102(e) Date: Mar. 5, 1991

[87] PCT Pub. No.: WO90/03017

PCT Pub. Date: Mar. 22, 1990

[30] Foreign Application Priority Data

Sep. 6, 1988 [NL] Netherlands ........................ 8802199

[51] Int. Cl.[5] ........................ G04B 47/00; G04F 8/00; B60Q 1/00

[52] U.S. Cl. ........................ 368/10; 368/107; 340/438; 340/459; 364/424.01

[58] Field of Search ........................ 368/101, 107–113, 368/28, 29; 340/438, 439, 457, 459, 462; 364/424, 442, 569

[56] References Cited

U.S. PATENT DOCUMENTS

| | | | |
|---|---|---|---|
| 3,792,445 | 2/1974 | Bucks et al. | 340/172.5 |
| 3,864,731 | 2/1975 | Callahan | 360/5 |
| 3,878,371 | 4/1975 | Burke | 235/92 PD |
| 3,922,649 | 11/1975 | Thome | 340/173 R |
| 3,938,092 | 2/1976 | Callahan | 340/150 |
| 4,067,061 | 1/1978 | Juhasz | 364/900 |
| 4,072,850 | 2/1978 | McGlynn | 364/424 |
| 4,179,740 | 12/1979 | Malin | 364/442 |
| 4,188,618 | 2/1980 | Weisbart | 340/201 R |
| 4,258,421 | 3/1981 | Juhasz et al. | 364/424 |
| 4,338,512 | 7/1982 | Ludwig | 235/927 |

FOREIGN PATENT DOCUMENTS

| | | |
|---|---|---|
| 0142013 | 5/1985 | European Pat. Off. . |
| 3221398 | 12/1983 | Fed. Rep. of Germany . |
| 3221399 | 12/1983 | Fed. Rep. of Germany . |
| 3223313 | 12/1983 | Fed. Rep. of Germany . |
| 3232416 | 3/1984 | Fed. Rep. of Germany . |
| 58-148912 | 9/1983 | Japan . |
| 2015208 | 9/1979 | United Kingdom . |
| 2015213 | 9/1979 | United Kingdom . |
| 2119095 | 11/1983 | United Kingdom . |
| 2141856 | 1/1985 | United Kingdom . |

*Primary Examiner*—Vit W. Miska

*Attorney, Agent, or Firm*—Bachman & LaPointe

[57] ABSTRACT

Method and system for recording and processing time-related data, in particular data relating to the operation and driving of vehicles. The time-related data to be processed are recorded autonomously with the aid of data collecting means and data recording means to be connected detachably thereto, with the addition of time-related reference codes, the reference codes being generated completely autonomously on the basis of a relative time unit.

15 Claims, 4 Drawing Sheets

METHOD AND ELECTRICAL SYSTEM FOR RECORDING AND PROCESSING TIME-RELATED DATE

The invention relates to a method of recording time-related data, in particular data relating to the operation and driving of vehicles, using a system comprising data collecting means providing said time-related data and data recording means to be connectable thereto, in which at least the time-related data to be processed are autonomously recorded with the data recording means with the addition of time-related reference codes.

A method of this type is described, inter alia, in the British Patent Specification 2,119,095, the German Patent Specification 3,221,399 and the German Patent Application 3,221,398.

In practice it is necessary in certain cases to know not only the nature but also the time when events occurred. In road transport, for example, the relationship between the driving and rest times of a driver is legally specified in many countries. For a supervisory authority it is therefore necessary, inter alia, for example when a check is made, to know the driving and rest times of a driver over a certain period up to the time of the check. For a haulier, logistic journey data such as waiting times, stopovers, fuel consumption and the like are important operating parameters. To assess data relating to the operation of a vehicle it is also necessary to know the time certain events occurred, for example in order to be able to make an accurate analysis subsequently. In this context, it is possible to think, in particular, of data relating to the speed, acceleration, distance travelled, etc. in order to reconstruct, for example, events preceding an accident.

According to the prior art, the data recording means are provided for this purpose with an integrated electronic clock module having second, minute, hour and data functions for providing the true or absolute time. The data to be processed are then stored in the data recording means with the addition of a reference code derived from the true time. The clock modules have an adjustment input for synchronizing with a master clock. The master clock is preferably accommodated in data processing means so that whenever the content of the data recording means is processed, the time and the date of the clock module can simultaneously be synchronized in the data recording means.

The British Patent Application 2,015,208 discloses a system in which the data collecting means are provided with a clock module. Because the data collecting means are, however, situated in the vehicles, synchronizing the clock modules used can be a time-consuming event in large systems for which a separate master clock is necessary.

The method according to the prior art has a number of disadvantages. As already stated, the clock modules have to be regularly checked and synchronized with a master clock. An exact relationship between the recorded reference codes and the true time of occurrence or the true duration of events is dependent on correctly synchronized and correctly functioning clock modules. In practice it has furthermore been found that systems in which a clock module which can be influenced externally is used, which is a necessary requirement for synchronizing said clock modules in systems which operate with reference codes derived from the true time, are fairly susceptible to undesirable manipulations.

Via the external access to the clock module necessary for the synchronization with a master clock, the former can be influenced by, for example, adjusting the time indication in a manner such that certain data are recorded with reference codes differing from the true time or from the true duration of occurrence. This may produce a distorted picture of the true situation for an authority checking driving and rest times, a haulier etc.

The object of the invention is therefore in the first instance to improve the method mentioned in the preamble in a manner such that confusion in relation to the exact time and/or the duration of occurrence of events to be recorded is eliminated as far as possible. According to the invention, this is achieved in that the reference codes are generated completely autonomously on the basis of a relative time unit, said relative time unit and reference codes being not adjustable by means external to the system. In this context, "a relative time unit" is understood to mean an independent time indication which does not refer to the true or absolute clock time, for example a time interval in seconds or parts thereof.

If now the manner in which the reference codes refer to the relative time unit is clearly laid down or known in the method according to the invention, a clock-related time associated with the respective reference codes can be provided in hours, minutes, seconds, etc. from the reference codes concerned on the basis of the relative time unit using a suitable processing algorithm.

In the use mentioned for the recording of driving and rest times in road transport, it is possible in this manner to produce a survey of the time duration of the use of a vehicle and/or the activities of a particular driver from the recorded data and the reference codes added thereto, for example, for the benefit of a supervising authority. It is obvious that the vehicle has to be provided with suitable sensors for this purpose such as, for example, a transducer which autonomously delivers a code or signal corresponding to the distance travelled or the rotation of the engine shaft.

To produce such a survey only the recorded reference codes and the relative time unit associated therewith are therefore necessary as time-referring data. This also reveals the most important advantage of the method according to the invention, namely that there is no longer any need to use in the data collecting or data recording means clock modules which indicate the true time and consequently have to be synchronized with a master clock. Owing to the elimination of the need for synchronization, there is therefore also no need to provide a synchronization input by means of which the relative time unit or the reference codes derived from it may be influenced externally in an undesirable manner directly or indirectly. The method according to the invention consequently has the potential to reduce the susceptibility to undesirable manipulations.

It is pointed out that a method for recording data with the addition of reference codes based on a relative time unit is known per se from the U.S. Pat. No. 3,922,649. This method provides, however, for setting a beginning or starting reference by external adjustment or resetting of the means which generate the reference codes. The invention is based on the insight that, if the data concerned are recorded automatically in the data collecting means via transducers and the like, it is not necessary to set a beginning or starting reference in the form of a fixed starting reference code or the like in order to be able to determine the interval of time between the start and the first recording. If the data to be recorded are autonomously available, it is possible to employ autonomously generated reference codes, that is to say, reference codes which cannot be influenced by external means.

The reference codes can refer in various ways to the relative time unit. In one embodiment of the method according to the invention a series of code values is generated autonomously on the basis of the relative time unit, the reference codes being formed autonomously from the code values time-related to the data to be processed. The instantaneous code values corresponding to the occurrence and/or termination of the data to be processed, inter alia, the starting or stopping of the engine of a vehicle, the detachment of the data recording means etc. are under these circumstances transformed if necessary into reference codes suitable for recording.

The length or extent of the series of code values depends, inter alia, on the period during which data are recorded between two successive processing cycles. To the extent to which this period becomes longer, a more extensive series of code values is necessary and this is accompanied in digital systems with long reference codes to be recorded which consist of many bits.

In order to limit the length of the reference codes and consequently also the memory capacity needed to record them, or in order to utilize the available memory capacity more effectively, in a further embodiment of the method according to the invention a series of code values is generated autonomously on the basis of the relative time unit, the reference codes being formed autonomously from the difference between code values time-related to successive data to be processed.

According to this further embodiment of the invention, only the difference between the instantaneous code values associated with successive data to be recorded is processed in each case into a reference code suitable for recording. In this context, the starting point may, for example, be the difference in code values associated with two successive random data or the difference between code values associated with successive corresponding data or data associated with one another.

In order to limit also the extent or the length of the bits of the code values, in yet a further embodiment of the invention a series of code values is generated autonomously on the basis of the relative time unit, the reference codes being formed autonomously from the code values time-related to the data to be processed, which series of code values is generated with successive data to be processed starting in turn from a predetermined code value.

Although in this yet further embodiment of the invention the reference codes also relate implicitly to the time difference measured in relative time units between two successive data to be recorded, which may also now again be random data or data associated with one another, it eliminates, however, the need to form the difference between successive code values. It is sufficient to convert the instantaneous code values into a suitable reference code, if necessary, when recording the data. A clock-related time associated with the respective reference codes can then be calculated with the data processing means on the basis of the predetermined code value. Because the series of code values is internally started again in each case from a certain starting position with the recording of an item of data, it is possible to manage with a less extensive series compared with the preceding embodiments or data can be recorded with an equally extensive series during a longer period. The series is restarted completely without external influence. A numerical series of code values can, for instance, be generated in each case, starting from a code value corresponding to the number zero.

Although the series of code values may in principle be generated in various manners, provided a clear relationship is ensured between the generated code values and the relative time unit, it is advantageous from the point of view of processing to provide a sequential numerical series of code values. To calculate clock-related times from the respective reference codes it is now possible to manage with a processing algorithm comprising only elementary arithmetical operations. A sequentially rising or falling series may be provided.

Apart from the possibility of generating a complex series of code values which is difficult to comprehend, a further safeguard against the undesirable altering of the reference codes can be provided according to still another embodiment of the invention in that the reference codes are formed in encoded form from the respective code values. Suitable encoding algorithms are known per se in practice.

Although the relative time unit may in principle be embodied, for example, in adjustable form, the relative time unit is generated with a fixed value of less than or equal to one second in the preferred embodiment of the method according to the invention with a view to eliminating the possibility of undesirable alteration of the relative time unit. It will be clear that to achieve relatively long recording periods, relative time units of a plurality of seconds may also be used. It has been found, however, that a desired accurate recording can be provided for many applications with a relative time unit of less than or equal to one second.

Because there is no need at all for presetting or resetting facilities, which can be influenced externally, for a generated reference code in the method according to the invention, the possibility of manipulating reference codes by, for example, electrical or electronic means is in principle eliminated.

Reference has already been made above to the calculation of a clock-related time from the respective recorded reference codes in relation to the time duration of recorded data. As already mentioned in the introduction, an authority supervising driving and rest times has, on the other hand, also a need for a survey of the relevant data over a period of, for example, 24 hours or multiples thereof prior to the instant of checking. A haulier will want to know the instant of occurrence and the duration of recorded data over a still longer period, for example in the order of magnitude of weeks or months. In this context, the date of occurrence of an event will also have to be calculated from the reference codes in addition to the clock time.

Accordingly, the invention further relates to a method suitable for processing reference codes based on a relative time unit and recorded with data recording means according to the invention, using data processing means to which the data recording means can, if necessary, be separately connected detachably for reading out data and reference codes for processing from the data recording means, from which reference codes and the relative time unit a corresponding clock-related time is calculated with the data processing means, wherein starting from the true time and/or the date of occurrence of a reference code, a corresponding true clock- and/or date-related time is calculated for the recorded reference codes.

It is possible to provide a survey of the relevant data in duration and time of occurrence calculated from or to the time of checking for the benefit of the supervising authorities mentioned by, for example, a further embodiment of the invention in which a reference code is taken as starting point for calculating the clock-related time on reading out the data from the data collecting means, which data recording means may be equipped for this purpose, for example, in a manner such that they deliver a reference code corresponding to the instantaneous code value last when reading out. Logistical journey data and the like can be provided with their exact time or date of occurrence for a haulier. Here again this can be done without the data collecting or data recording means having to be provided with clock modules for providing the true or absolute time, as in the method according to the prior art.

The method according to the invention also circumvents a further disadvantage of employing reference codes referring to the true time, namely the fact that, for example, in international road transport with the known method due account has to be taken of differences in the true time between the various countries or states, which can easily give rise to incorrect interpretations of the time of occurrence of particular events. This is also true, for example, for differences between summer and winter time.

Because the clock-related times are calculated with the data processing means in the method according to the invention, the intelligence necessary for correcting such time differences can also be incorporated in said means. An authority supervising driving and rest times will be able to manage with data processing means lacking said intelligence because the survey to be produced for said authorities has to be provided only over a limited period prior to the instant of checking. With respect to the known method, errors relating to absolute time differences are also in this case eliminated with the method according to the invention because such a survey is constructed exclusively on the basis of the reference codes and the relative time unit associated therewith. The data processing means may be incorporated separately or in the data collecting means.

Consequently the invention also provides a method for processing reference codes based on a relative time unit and recorded with data recording means according to the invention, using data processing means to which the data recording means can, if necessary, be separately connected detachably for reading out data and reference codes for processing from the data recording means, from which reference codes and the relative time unit a corresponding clock-related time is calculated with the data processing means, wherein a clock-related time for successively recorded data which are associated with one another is calculated from the recorded reference codes associated therewith.

The invention also relates to a system for electronically recording and processing time-related data, in particular data relating to the operation and driving of vehicles, to carry out the method according to the invention, comprising data collecting means, data processing means, data recording means connectable to the data collecting means and/or the data processing means, and means for generating time-related reference codes consisting of counter means and generator means, coupled to said counter means, for autonomously driving the counter means, characterized in that the counter means are provided with at least one counter unit the count number of which and said generator means are not adjustable by means external to the system, the time-related data to be processed are autonomously recorded with the data recording means with the addition of reference codes based on said count number.

The count numbers generated by the counter unit may correspond to the said series of code values mentioned before in connection with the embodiments regarding the method according to the invention.

As a departure from the system according to the U.S. Pat. No. 3,922,649 mentioned, the system according to the invention does not have any facility for influencing the counter unit from outside. Because the relative time unit and/or the manner in which the reference codes are derived from the relative time unit can be set in an unalterable manner in accordance with the method according to the invention, the counter means may consist of unintelligent "read-only" units lacking externally accessible inputs for the resetting or presetting thereof which are susceptible to interference.

In practice it has further been found that electronic clock modules are fairly susceptible to interference as a consequence of the intelligence needed for checking and adjusting the time and data functions. In high-interference environments, such as, for example, a vehicle, expensive and elaborate measures have to be taken to make, for example, an integrated digital clock module operate reliably. An interference pulse on one or more of the synchronization inputs of the clock module may in fact cause, in an unfavourable case, an error of one or more hours or days. In practice it is found to be impossible, or only possible after much effort, to process data which are recorded with an incorrect time reference of this type.

A counter circuit is appreciably less susceptible to interference than a clock module. This is because an interference pulse at the input of the counter means to which the generator means are connected can at most cause an error of a few time units. By choosing the time unit less than or equal to one second in accordance with the invention, the effect of such an interference pulse can in practice be kept negligibly small.

In practice it has been found that an embodiment of the system according to the invention in which the counter means comprise an at least 32-bit sequential digital counter unit and the generator means are equipped for generating control pulses having a frequency greater than or equal to 1 Hz is suitable for many applications. In this context, the frequency of the generator means which determines the relative time unit to which the reference codes refer is permanently adjusted. By incorporating an electronic gate circuit, for example, between the generator means and the counter unit, the effect of randomly occurring interference signals can be limited still further. The reliability of the system according to the invention is, as a result, significantly greater than that of the known systems of this type partly because the means used can be simpler in construction.

In order to limit the length of the reference codes, i.e. their number of bits, and consequently also the storage capacity needed for recording thereof, or in order to utilize the available storage capacity more effectively, in yet a further embodiment of the system according to the invention, said means for generating the reference codes comprise means, coupled to the counter means, for forming the difference between count numbers of the counter means. In still another embodiment with the same object the counter means are equipped only for internal adjustment thereof to a predetermined count number. With successive or associated data to be recorded, the counter means are reseted in turn. Note that the resetting or adjustment of the counter means to said predetermined count number takes place completely automatically within the system itself, without any possibility of external resetting whatsoever.

Said means for generating the reference codes can be incorporated, inter alia, in the data collecting means. Because the reference codes are generated according to the invention on the basis of a relative time unit, the disadvantage mentioned in connection with regularly having to synchronize clock modules in the data collecting means is eliminated. If a true time or date of occurrence has to be assigned to the data to be processed, it is necessary to know the reference code at a particular time. Under some circumstances, for example in the case of an extensive vehicle fleet or for supervising authorities, it may be troublesome to have to extract the relevant reference code from the data collecting means situated in the vehicle.

In the preferred embodiment of the system according to the invention consequently said means for generating the reference codes are incorporated in the data recording means. The incorporation of the counter means, the generator means and, if necessary, the means for forming the difference between counter numbers of the counter means in the data recording means has the advantage that the instantaneous counter setting is immediately available on connection to the data processing means. Of course, the data recording means have to be provided with suitable supply source means therefor to achieve the result that the counter means, the generator means and, if necessary, the means for forming the difference between counter numbers of the counter means also continue to operate if the data recording means are not connected to the data collecting or data processing means.

The invention also relates to data recording means suitable for use in the system according to the invention, which data recording means further comprise memory means and supply source means, characterized in that the memory means are equipped for only reading out by means external to the data recording means.

In order to prevent the memory means being able to become full, as a result of which data are no longer recorded, in a further embodiment of the data recording means according to the invention the memory means comprise at least one roll-over memory.

It should be understood that the tying up of data with an associated time reference is not limited to data which occur in, and are associated with, a vehicle but that knowledge relating to the time of occurrence of particular autonomously occurring events or the duration thereof may be necessary for many types of fields of application.

The invention is explained below on the basis of a diagrammatic embodiment, shown in the drawing, of an electronic system for digitally recording and processing time-related data in a vehicle environment and flowcharts for illustrating the method according to the invention.

DETAILED DESCRIPTION OF THE EMBODIMENTS

Figure 1:
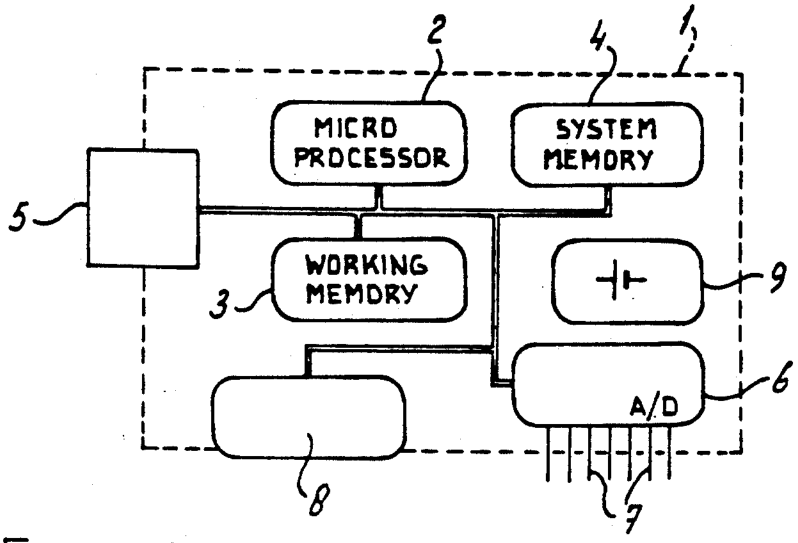
FIG. 1 shows a diagrammatic representation of the structure of the data collecting means which are mounted in a vehicle.

The data collecting means, which are indicated as an entity by the reference numeral 1, comprise a bus structure containing electronic components, known per se, which are coupled to one another and which include a microprocessor unit 2, a working memory 3, a system memory 4, an access port 5 for detachably connecting the data recording means, analog/digital convertors 6 having inputs 7 to which vehicle sensors such as speed transducers and acceleration transducers, distance meters, fuel gauges and the like (not shown) can be connected, and also a control port 8 for supplying calibration data and the like to, or receiving them from, the diverse vehicle sensors. If required, means for manually feeding in data and means for displaying data (not shown) may also be provided.

The data collecting means 1 further comprise supply means 9 for supplying electrical power in a suitable manner to the electronic components. Preferably, the supply means 9 are provided with their own power supply, such as a rechargeable battery, for, for example, maintaining the data in the system memory and working memory during a malfunction in the power supply from the vehicle. The data collecting means are comparable in terms of construction with the data collecting means 1 shown in FIG. 1 of British Patent Specification 2,119,095.

Figure 2:
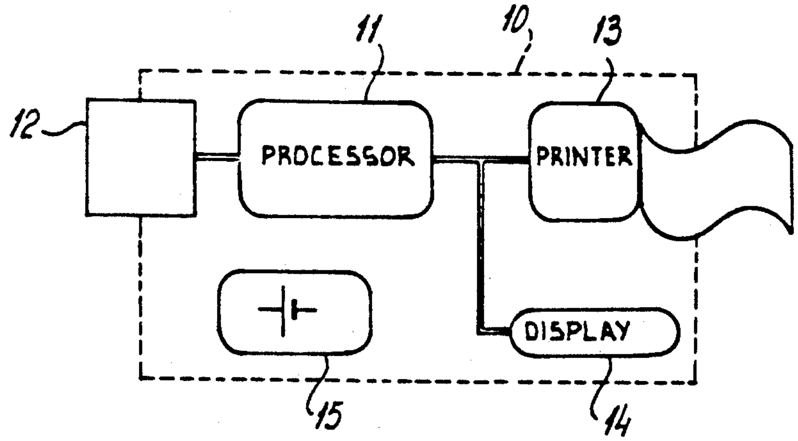
FIG. 2 shows a diagrammatic representation of the structure of data processing means.

FIG. 2 diagrammatically shows the structure of electronic data processing means indicated by the reference numeral 10. With the aid of a processor unit 11 known per se and suitable software associated therewith, data can both be fed to, and removed from, the data registration means to be detachably connected hereto via the access port 12. In the first case, it is possible to think, for example, of calibration data, access data and the like which may be necessary, inter alia, for identification purposes. The system data fed in this manner to the data recording means may be further processed by the data collecting means 1.

The data processing means 10 further comprise a printer unit 13 and a display unit 14, in order, inter alia, to be able to render the processed data visible. The data processing means 10 may be of very comprehensive extent, for example in the form of a "personal computer" in an office environment for producing detailed logistic data, or be incorporated with the data collecting means 1 as an entity in a vehicle, but they may, for example, also be of compact and portable construction for the benefit of the supervising authorities, for example for processing a limited amount of data which relate to the driving and rest times of a driver or vehicle. In the latter case, data processing means 10 may be equipped with, for example, a chargeable supply unit 15. If necessary, the data processing means 10 may be provided with further connections for connecting to a central computer (not shown).

Figure 3:
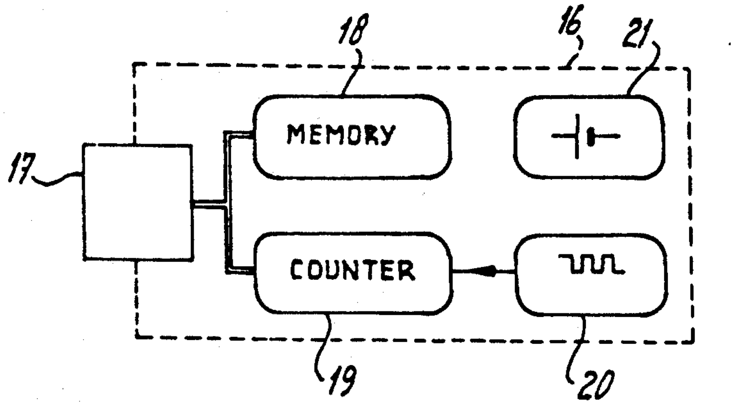
FIG. 3 shows a diagrammatic representation of data recording means according to the invention.

FIG. 3 shows the structure of the data recording means according to the invention, which are indicated as an entity by the reference numeral 16. The data recording means are preferably accommodated in a cassette which can be detachably connected via the access port 17 to a corresponding access port 5 or 12 of, respectively, the data collecting means 1 or the data processing means 10. The access ports 5, 12 and 17 are constructed in the exemplary embodiment as matching plug connections but they can also be equipped as optical, acoustic, radiographic, etc. access ports.

The data recording means 16 comprise a digital electronic memory 18, known per se, which is coupled to the access port 17 via a bus structure, and a digital counter 19. The memory 18 preferably comprises a plurality of so-called "roll-over memories", as they are known in the English-language specialist literature. The counter 19 is autonomously driven via an oscillator 20. The data recording means 16 are further provided with their own supply source means 21, for example ion the form of a rechargeable battery. The supply source means 21 may furthermore be constructed in a manner such that if the data recording means 16 are coupled to the data collecting means 1 or the data processing means 10, the necessary supply power is drawn from said means. In the said embodiment, the counter 19 and the oscillator 20 are constructed and screened in a manner such that they cannot be influenced from outside by electrical or electromagnetic means.

The counter 19 is constructed as a 32-bit sequential digital counter, the oscillator 20 generating square wave control pulses having a frequency of 1 Hz. Each step of the counter 19 then corresponds to a time duration of one second. It is obvious that higher frequencies under a more or less extensive counter may also be employed, both being dependent on the recording method, the recording accuracy, the duration of use between successive processing cycles of the recorded data, etc. The components of the data recording means 16 may furthermore be accommodated as far as possible in one multifunctional integrated digital circuit. The operation of the system is now as follows.

Assume the situation where the data recording means 16 are connected to the data collecting means 1 in a vehicle. The counter 19 generates a sequential numerical code under the influence of the oscillator 20. At the instant when, for example, a particular item of data has to be recorded in the memory 18 of the data recording means 16, a reference code corresponding to the instantaneous count number of the counter 19 is added to the item of data concerned under the control of the microprocessor 2 of the data collecting means 1, after which the combination formed in this way is stored in the memory 18.

Because the data recording means 16 are provided with their own supply source means 21, the counter 19 and the oscillator 20, and also the data stored in the memory 18 continue to operate or to be maintained. The current consumption in the quiescent state is under these circumstances so low that a long operating time can be achieved. Together with the fact that the counter 19 and the oscillator 20 are able to operate autonomously, that is to say, without being influenced from outside,. it is possible to accommodate the data recording means 16 in an entirely sealed housing, which housing cannot be violated without perceptible external damage. It will be clear that the susceptibility to fraudulent manipulations is thereby effectively reduced further.

Furthermore, by providing encodings, for example, by programming means, it is possible to prevent the possibility of the data recording means being read out or erased, for example, by unauthorized persons, and to ensure that interchange of different recording means is impossible. In this connection, it is possible to think of adding access codes related to certain vehicles, certain processing means, etc. The recorded data can be processed in a completely programmed manner.

To derive a suitable reference code from the instantaneous count number of the counter, a distinction may be made, according to the invention, between three main principles which are all illustrated by means of flowcharts in which blocks indicated by the same reference numerals perform the same operations.

Figure 4:
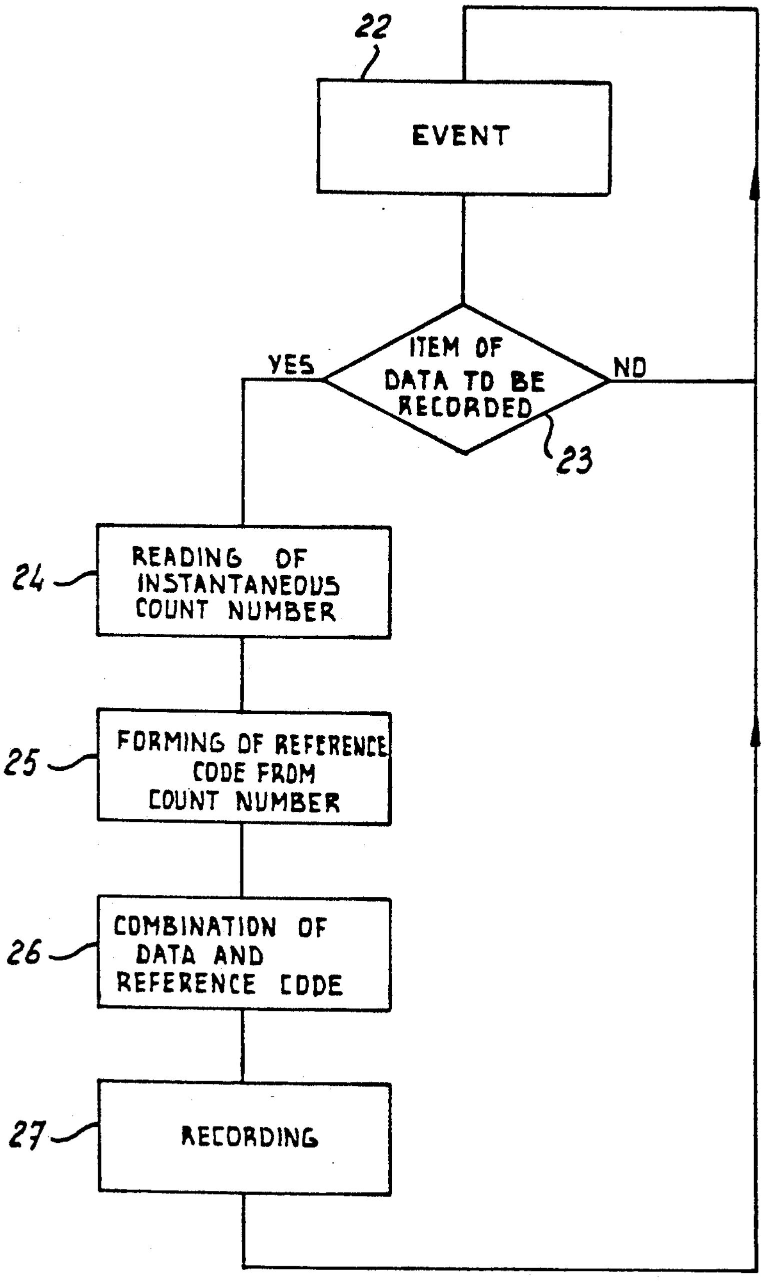
FIGS. 4, 5, 6 show flowcharts illustrating different embodiments of the method according to the invention.

FIG. 4 shows the method according to the invention in which a suitable reference code for recording with an item of data to be processed is generated directly from the instantaneous count number. In the simplest case, the counter generates a count number in digital code which is recorded directly as reference code. In more complex embodiments, a reference code can be generated from the count number of the counter, if necessary, using an encoding algorithm.

Assume that an event 22 occurs. As block 23 illustrates, it may first be decided, if necessary, whether this is an event to be recorded and therefore provides an item of data to be processed. If this question is answered affirmatively, the instantaneous count number is read, as indicated by block 24. Then a reference code is formed from the count number read (block 25). Said reference code is then combined with the item of data to be processed, as indicated in block 26, after which the combination formed in this manner is autonomously recorded in the data recording means (block 27). According to needs, a selection may be made in block 23, if necessary, on the basis of the type of data to be recorded in order to create specific information groups, which may simplify the subsequent processing, for example an information group which relates to driving and rest times, an information group with respect to specific vehicle data etc.

A time duration associated with the recorded data can be calculated in hours, minutes, seconds, etc. from the reference codes associated with the successively recorded data, if necessary divided up in terms of information group, for example, by conversion to the associated count number on the basis of the frequency of the generator. When the true time of occurrence of a count number is known, an associated true clock time or date can be calculated for all the count numbers or reference codes. A supervising authority is able to obtain a survey of the driving and rest times up to the time of checking on the basis of the reference code, associated with the instantaneous count number, at the time of the check. A haulier may, on the other hand, also record the reference code, associated with a count number, at the beginning for example, a journey of a driver or vehicle and calculate, on return, an accurate true time and date for the reference codes recorded during the journey on the basis of said reference code and the time associated therewith.

Figure 5:
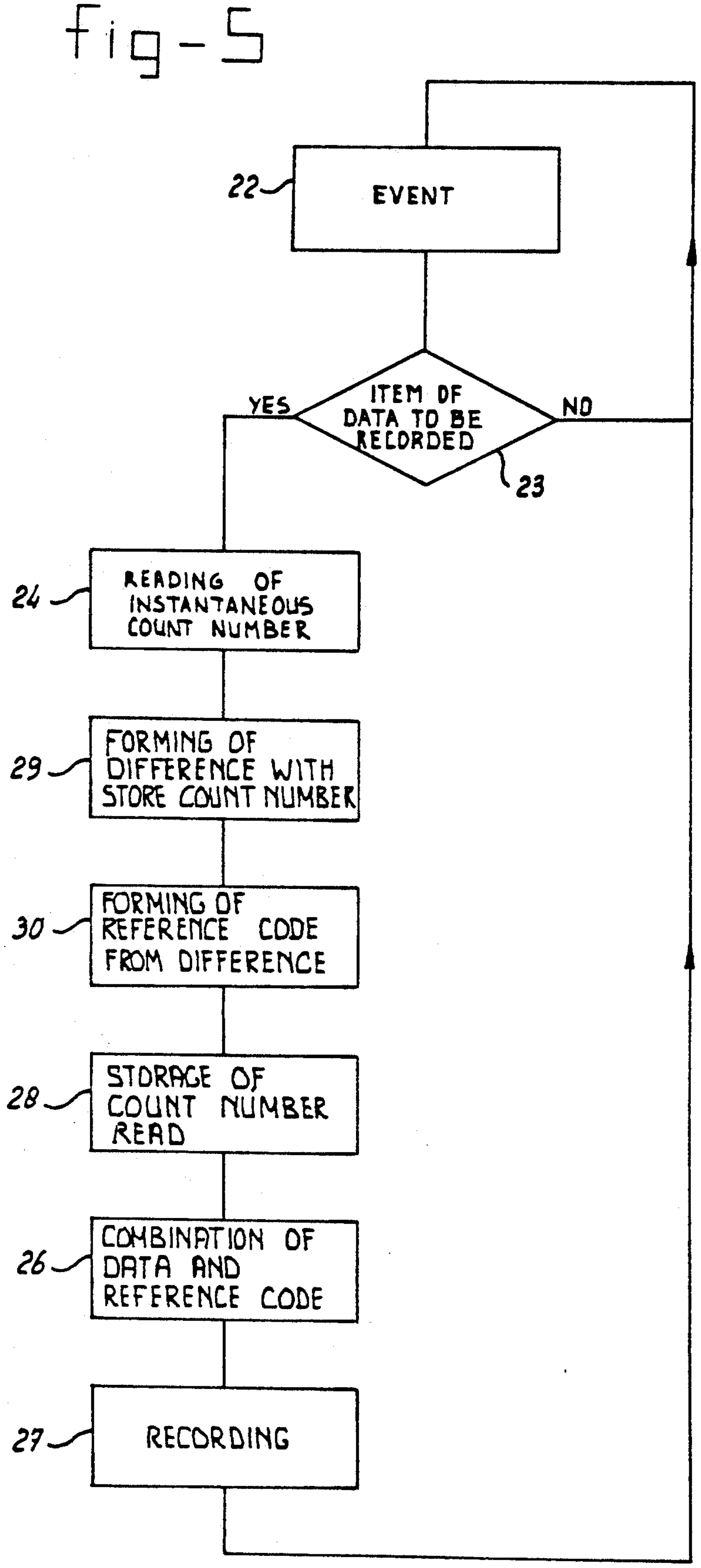

FIG. 5 shows the method in which the difference between the count numbers associated with two successive data to be processed is employed. These may, of course, be random successive data or data per information group. In block 28 a count number read is temporarily stored. When the instantaneous count number associated with an item of data is read (block 24), the difference between the count number read out and the preceding stored count number is formed in block 29. From this difference, a reference code is again derived (block 30) which is then again combined with the item of data to be recorded and recorded.

In processing the data recorded in this manner, an associated clock-related time can be calculated because the reference codes or the count numbers corresponding thereto indicate the number of time units which are situated between the subsequently recorded data. The true time and date associated with the recorded data can also now be reconstructed again on the basis of the true time of a reference code.

Figure 6:
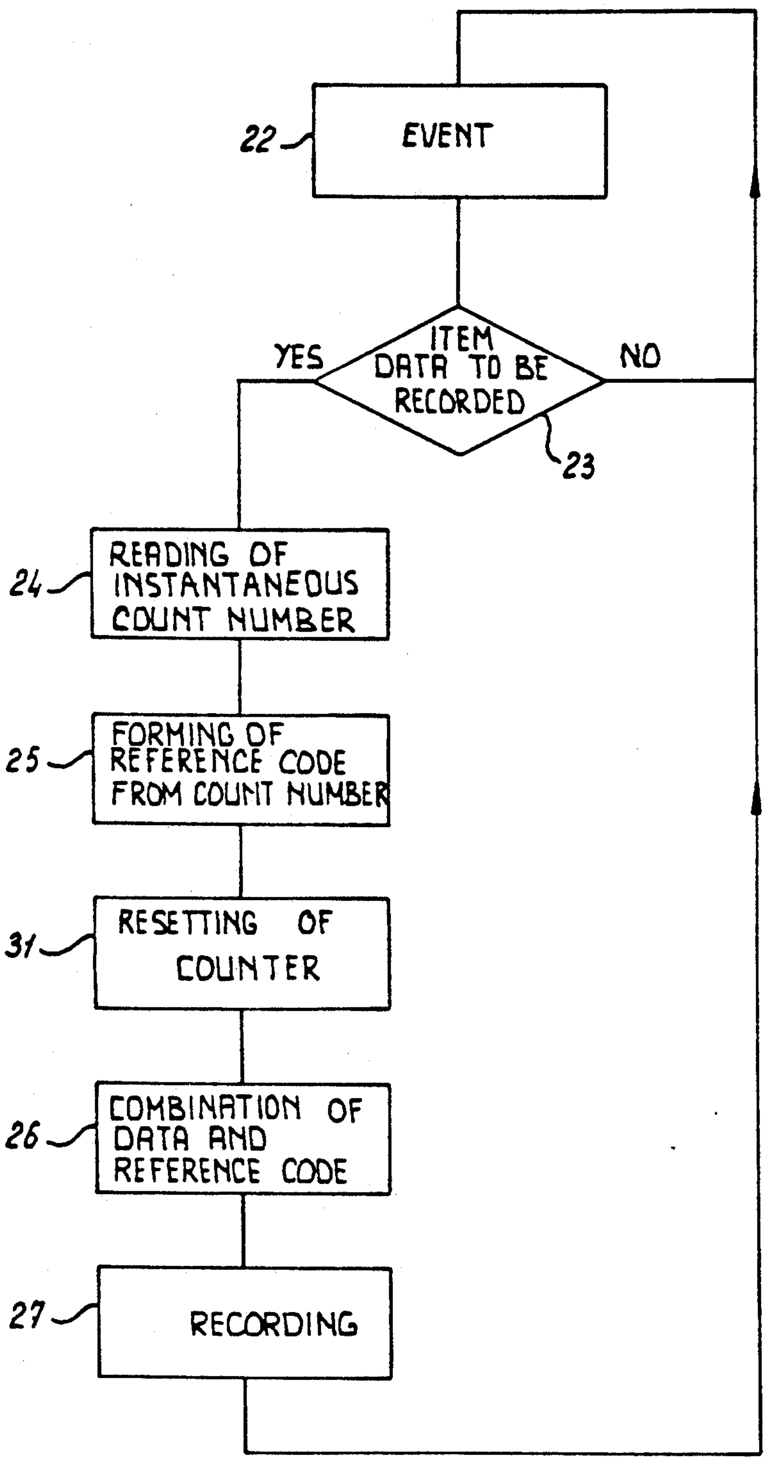

FIG. 6 shows the flowchart of an embodiment of the method according to the invention in which the reference codes also refer to the number of time units situated between successively recorded data, but in this case, the count number read is not temporarily stored, but the counter is always reset to a predetermined count number. In an advantageous embodiment as regards processing, the counter is reset to zero. The resetting of the counter is illustrated by block 31. This method is, for example, attractive if such long recording periods are to be expected that an elaborate counter is necessary in order to be able to provide clear reference codes during these long recording periods.

In this last embodiment, a true time of occurrence can be assigned to recorded data on the basis of the time of reading out the data recorded last. By providing, for example, a code which indicates the method by which the reference codes are generated, it is possible to manage with one processing algorithm so that a universal system can be provided for processing time-related data in accordance with the invention.

A further measure for preventing fraudulent manipulations or the unavailability of the recorded data as a result of malfunction, is the incorporation of a "back-up" memory in the data collecting means 1. The same data can then be recorded in said back-up memory, which may form part of the system memory 4, as in the data recording means 16.

Although the invention has been described on the basis of an exemplary embodiment of a system for use in vehicles, it will be clear that the invention is not limited to these embodiments and can be used in many types of field in which there is a need to record time-related data. Numerous modifications and additions to the invention are possible for a person skilled in the art without departing from the idea on which the invention is based.

I claim:

1. A method of electronically recording time-related data, in particular data relating to the operation and driving of vehicles having a plurality of data sensors, using a system comprising data collecting means, data recording means and means for generating reference code signals representative of time data, comprising the steps of:

collecting data from the sensors using the data collecting means;

generating reference code signals using the generating means;

associating to collected data to be processed reference code signals generated time-related to said data, and storing the collected data to be processed and the associated reference code signals in the data recording means, wherein said generating step comprises:

generating completely autonomously said reference code signals based on a relative time unit, said reference code signals being not adjustable by means external to the system.

2. A method of recording time-related data according to claim 1, wherein said generating step comprises generating completely autonomously a series of code value signals from said relative time unit, and forming autonomously said reference code signals from the code value signals time-related to the collected data to be processed.

3. A method of recording time-related data according to claim 1, wherein said generating step comprises generating completely autonomously a series of code value signals from said relative time unit, and forming autonomously said reference code signals from the difference between the code value signals time-related to successively collected data to be processed.

4. A method of recording time-related data according to claim 1 wherein said generating step comprises generating completely autonomously a series of code value signals from said relative time unit, said series of code value signals being generated with successively collected data to be processed starting in turn from a predetermined code value, and forming autonomously said reference code signals from the code value signals time-related to the collected data to be processed.

5. A method of recording time-related data according to claim 1 wherein said generating step comprises generating completely autonomously a series of code value signals from said relative time unit, and forming autonomously in encoded form said reference code signals from the code value signals time-related to the collected data to be processed.

6. A method according to claim 1 including the step of processing reference code signals recorded according to claim 1, using data processing means and clock means for providing time data representative of at least one of the true time and date, comprising the steps of:

reading collected data and associated reference codes from the data recording means;

reading an instantaneously generated reference code signal;

linking said instantaneous reference code signal to at least one of the true time and date of occurrence of said reference code signal; and calculating from said at least one of the true time and date linked reference code signal and said relative time unit corresponding at least one of the true clock and data related time data for said read reference code signals.

7. A method according to claim 1 including the step of processing reference code signals recorded according to claim 1, using data processing means and clock means for providing time data representative of at least one of the true time and date, comprising the steps of:

reading collected data and associated reference codes from the data recording means;

reading a reference code signal instantaneously generated on reading the collected data and associated reference code signals;

linking said instantaneous reference code signal to at least one of the true time and data of occurrence of said reference code signal; and calculating from said at least one of the true time and date linked reference code signal and said relative time unit corresponding at least one of the true clock and date related time data for said read reference code signals.

8. A method according to claim 1 including the step of processing reference code signals recorded according to claim 1, using data processing means and clock means for providing time data representative of at least one of the true time and date, comprising the steps of:

reading collected data and associated reference codes from the data recording means;

reading an instantaneously generated reference code signal;

linking said instantaneous reference code signal to at least one of the true time and date of occurrence of said reference code signal; and calculating from said at least one of the true time and date linked reference code signal and said relative time unit corresponding at least one of the true clock and date related time data for reference code signals associated to successively collected mutually associated data.

9. A system for electronically recording and processing time-related data, in particular data relating to the operation and driving of vehicles having a plurality of data sensors, comprising data collecting means, and data processing means, and data recording means detachably connectable to both the data collecting means and the data processing means, and means for generating reference code signals representative of time data including counter means and oscillator means, coupled to the counter means, for autonomously driving the counter means, wherein the counter means are provided with at least one counter unit the count number of which and the oscillator means being not adjustable by means external to the system, the collected data to be processed and the reference code signals generated time-related to said collected data are autonomously, associatively recorded in the data recording means.

10. A system for electronically recording and processing time-related data according to claim 9, wherein the counter means is equipped for internal adjustment thereof to a predetermined count number.

11. A system for electronically recording and processing time-related data according to claim 9, wherein the means for generating the reference code signals comprise means, coupled to the counter means, for forming the difference between count numbers of the counter means.

12. A system for electronically recording and processing time-related data according to claim 9, wherein the means for generating the reference code signals are incorporated in the data collecting means.

13. A system for electronically recording and processing time-related data according to claim 9, wherein the means for generating the reference code signals are incorporated in the data recording means.

14. A system according to claim 9, further comprising memory means, supply source means and means for detachably connecting said data recording means to the data collecting means and the data processing means, wherein the memory means are equipped for only reading out by means external to said data recording means.

15. A system according to claim 14, wherein the memory means comprise at least one roll-over memory.

* * * * *